(12) United States Patent
Selenberg

(10) Patent No.: US 12,043,530 B2
(45) Date of Patent: Jul. 23, 2024

(54) CLOSURE OPENER

(71) Applicant: Reaction Items LLC, Lexington, KY (US)

(72) Inventor: Kirk Thomas Selenberg, Lexington, KY (US)

(73) Assignee: Reaction Items LLC, Lexington, KY (US)

( * ) Notice: Subject to any disclaimer, the term of this patent is extended or adjusted under 35 U.S.C. 154(b) by 656 days.

(21) Appl. No.: 17/248,141

(22) Filed: Jan. 11, 2021

(65) Prior Publication Data

US 2021/0316976 A1   Oct. 14, 2021

Related U.S. Application Data

(60) Provisional application No. 63/008,063, filed on Apr. 10, 2020.

(51) Int. Cl.
*B67B 7/00* (2006.01)
*B29D 99/00* (2010.01)
(Continued)

(52) U.S. Cl.
CPC ............... *B67B 7/14* (2013.01); *B29D 99/00* (2013.01); *B29K 2021/003* (2013.01); *B29K 2075/00* (2013.01)

(58) Field of Classification Search
CPC ...................................... B67B 7/14; B67B 7/18
See application file for complete search history.

(56) References Cited

U.S. PATENT DOCUMENTS 4,760,763 A * 8/1988 Trick ...................... B67B 7/18
  81/3.4
2011/0157056 A1 * 6/2011 Karpfinger .............. G06F 3/041
  345/173

(Continued)

FOREIGN PATENT DOCUMENTS

DE  202008013778 U1    3/2010
DE  202017106890  * 11/2017 ............... B67B 7/18
(Continued)

OTHER PUBLICATIONS

Written Opinion of the International Searching Authority for PCT/US2021/026529 dated Sep. 6, 2021.

*Primary Examiner* — Eyamindae C Jallow
(74) *Attorney, Agent, or Firm* — Buchanan Ingersoll & Rooney PC

(57) ABSTRACT

Disclosed is a closure opener device having a pad-like member made from a flexible material exhibiting a desired coefficient of friction. The body of the device conforms to the user's hand as well as to the closure top of a container. The device has a hand surface that is configured to favorably interface with the skin of the palm and fingers so as to provide friction and making it comfortable to grip. The device has an opposing gripping surface that is used to engage the closure top. The gripping surface is configured to deliver enough friction while opening closure tops made of various materials, having various surface finishes, and having various foreign contaminants disposed thereon. When engaged with a closure top, the thickness of the device's body wraps around the closure top to effectively increase the diameter of the closure top, making manipulation of the closure top easier.

19 Claims, 4 Drawing Sheets

(51) Int. Cl.
*B67B 7/14* (2006.01)
*B29K 21/00* (2006.01)
*B29K 75/00* (2006.01)

(56) References Cited

U.S. PATENT DOCUMENTS

2016/0159630 A1* 6/2016 Furrer ..................... A47J 45/10
    16/435
2016/0318196 A1* 11/2016 Reder ..................... B26B 11/00
2017/0320716 A1* 11/2017 Ranftl ..................... B67B 7/184
2019/0177146 A1* 6/2019 Valentine ................. B67B 7/14
2019/0367345 A1* 12/2019 Billmeier ................. B67B 7/18

FOREIGN PATENT DOCUMENTS

| DE | 202017106890 U1 | | 2/2019 | | |
|----|----|----|----|----|----|
| KR | 20180024402 | * | 3/2010 | ............... | B67B 7/18 |
| WO | WO2004043705 | * | 5/2004 | ............... | B42D 3/04 |

\* cited by examiner

CLOSURE OPENER

CROSS-REFERENCE TO RELATED APPLICATIONS

This application is related to and claims the benefit of U.S. Provisional Application No. 63/008,063, filed on Apr. 10, 2020, the entire contents of which is incorporate herein by reference.

BACKGROUND OF THE INVENTION

Field of the Invention

This invention relates to closure openers for containers. More particularly, the invention relates to closure openers for use with a variety of containers including twist-top bottles, twist-top jars, twist-top beverage containers, vacuum-sealed jars, and crimped-on bottle closures (twist-off types).

Background of the Related Art

Various closure openers for bottles, jars, and food and beverage containers with twist-off tops and pry-off tops are found in most households today. However, over the years, to enable users to open closures without needing the help of these tools, closure manufacturers have replaced a significant portion of pry-off tops with twist-off tops.

Unfortunately, many of these twist-off screw tops are difficult for the average user to open using bare hands. Additionally, the ability to open closures with twist-off screw tops can be negatively impacted by a multitude of factors including the introduction of perforated tamper seals, small or large diameter tops relative to the user's hands, sharp corners around the top edge of caps, screw tops made with smooth surfaces or materials that offer less friction with the hand, chilly temperatures affecting the users hands, and the presence of contaminants. Contaminants may include sand, moisture, sweat, lotion, or oil, and the like, any or all of which could decrease contact friction during the opening process. Further, some users have additional challenges when opening these twist-off bottles, including arthritis, age related or functional limitations, and decreased hand strength.

The increased availability of portable bottles, jars, and food and beverage containers with twist-off tops has led to a prevalence of use while on-the-go, and not just while in the kitchen. Many openers take up considerable space, are too rigid, are shaped inconveniently for placement in a pocket, or are not easily attached to garments, keychains, or personal accessories. Since these closure openers are not conveniently portable for the user, they are ultimately not carried by the user and present when needed while on-the-go.

In view of the above, a need exists in the field for a novel closure opener, more particularly in at least one embodiment a portable closure opener, which can be used to open twist-off screw caps. The present invention relates generally to closure openers fabricated from thin, flexible pads which are portable, readily available, and comfortable to the user's hand when opening closures of various shapes and sizes.

SUMMARY OF THE INVENTION

In the embodiment disclosed below, the apparatus is constructed from an injection-molded single piece of rubber-like material, although other flexible materials or combinations having a sufficiently high coefficient of friction would suggest themselves to those of ordinary skill in the art. The body of the apparatus, in the form of a flexible, elongated, thin pad conforms to the user's hand as well as to the closure top during the opening process. It has two opposing surfaces, each performing different functions. The surface against the hand is configured to favorably interface with the skin of the palm and fingers, both ensuring enough friction and making it comfortable to grip. The hand surface also allows for printing personalized markings or branding. The opposing surface, used to engage the closure top, is configured to deliver enough friction while opening closure tops made of various materials and surface finishes, in different environments, and in the presence of foreign liquids and oils. When operatively engaged with a closure top, the thickness of the device's body wraps around the top and increases the diameter of the top, making the manipulation of the top easier (e.g., it is easier to grip and open).

In the embodiment disclosed below, the neck on one end of the closure opener is thicker with a mounting hole passing through its entirety. The mounting hole allows the opener to be attached to another object, such as a key chain, for easy access and portability. The thicker neck on the body prevents tearing of the flexible material at the hole and is designed to be durable throughout its useable life and stay secure during physical activities such as running.

In an exemplary embodiment, a closure opener device includes a pad body having a pad top, a pad bottom, pad sides, a pad gripping surface, a pad hand surface, and a pad thickness defined as a distance between the pad gripping surface and the pad hand surface. The pad body comprises a material having a Shore A durometer hardness less than or equal to 80, a Modulus of Elasticity of less than or equal to 10, and a coefficient of friction of at least 0.2. The thickness is at least 0.0396 cm.

In some embodiments, the material is silicone rubber.

In some embodiments, the silicone rubber is liquid silicone rubber or compression molded silicone rubber.

In some embodiments, the material is thermoplastic polyurethane (TPU).

In some embodiments, the material is thermoplastic elastomer (TPE).

In some embodiments, the thickness is within a range from 0.0396 cm to 1.27 cm.

In some embodiments, the Shore A durometer hardness is within a range from 10 to 80.

In some embodiments, the Modulus of Elasticity is within a range from 1.0 to 10.0.

In some embodiments, the coefficient of friction is within a range from 0.20 to 0.80.

In some embodiments, at least one of the pad gripping surface and the pad hand surface is polished.

In some embodiments, the pad hand surface is textured.

In some embodiments, the pad hand surface includes a printed ink marking.

In some embodiments, the pad top and the pad bottom each have a length within a range from 1.27 cm to 30.48 cm, the pad side surfaces each have a length within a range from 2.54 cm to 30.48 cm, and the thickness is within a range from 0.0396 cm to 1.27 cm.

In some embodiments, the pad body at or near the pad top includes an aperture.

In some embodiments, the pad body at or near the pad top includes a neck that is defined by an increase in thickness of the pad body.

In an exemplary embodiment, a method of loosening or disengaging a closure top from a container involves: placing a pad body having a pad top, a pad bottom, pad sides, a pad gripping surface, and a pad hand surface in a user's hand such that at least a portion of the pad body resides in a cusp of the user's hand and such that the pad hand surface is adjacent the user's hand; placing the pad body against a closure top so that at least a portion of the pad gripping surface envelopes at least a portion of the closure top; closing the hand to conform the pad body to the user's hand and to the closure top; and manipulating the pad body to transfer forces from the user's hand to the closure top via the pad body, wherein the transfer of forces loosens or disengages the closure top from the container.

In some embodiments, placing the pad body in the user's hand involves causing at least a portion of the pad body making contact with a user's finger.

In some embodiments, the pad body, while residing in the cusp of the user's hand, extends from a palm of the hand, leads into the cusp of the hand, and extends to the user's finger.

In some embodiments, the method involves tethering the pad body to an ancillary object via an aperture formed in the pad body.

In an exemplary embodiment, a method of loosening or disengaging closure tops from containers involves: placing a pad body having a pad top, a pad bottom, pad sides, a pad gripping surface, a and pad hand surface in a user's hand such that at least a portion of the pad body resides in a cusp of the user's hand and such that the pad hand surface is adjacent the user's hand; placing the pad body against a first closure top of a first container so that at least a portion of the pad gripping surface envelopes at least a portion of the first closure top; closing the hand to conform the pad body to the user's hand and to the first closure top; and manipulating the pad body to transfer forces from the user's hand to the first closure top via the pad body, wherein the transfer of forces loosens or disengages the first closure top from the first container; and placing the pad body against a second closure top of a second container so that at least a portion of the pad gripping surface envelopes at least a portion of the second closure top; closing the hand to conform the pad body to the user's hand and to the second closure top; and manipulating the pad body to transfer forces from the user's hand to the second closure top via the pad body, wherein the transfer of forces loosens or disengages the second closure top from the second container. The first closure top has a size that differs from a size of the second closure top; and/or an engagement between the first closure top and the first container differs from an engagement between the second closure top and the second container.

In an exemplary embodiment, a method fabricating a closure opener device involves: introducing a material into a mold to form a pad body, the material having a Shore A durometer hardness less than or equal to 80, a Modulus of Elasticity of less than or equal to 10, and a coefficient of friction of at least 0.2, the pad body comprising: a pad body having a pad top, a pad bottom, pad sides, a pad gripping surface, a pad hand surface, a pad thickness defined as a distance between the pad gripping surface and the pad hand surface, the thickness being at least 0.0396 cm. The introducing into the mold involves injection molding, compression molding, or pour molding.

BRIEF DESCRIPTION OF THE DRAWINGS

Shown in the attached drawing are the preferred embodiments of the present invention. Embodiments of the present invention are illustrated as examples and are not limited by the figures of the accompanying drawings, in which like references may indicate similar elements, and in which.

DETAILED DESCRIPTION OF THE INVENTION

Figure 1:
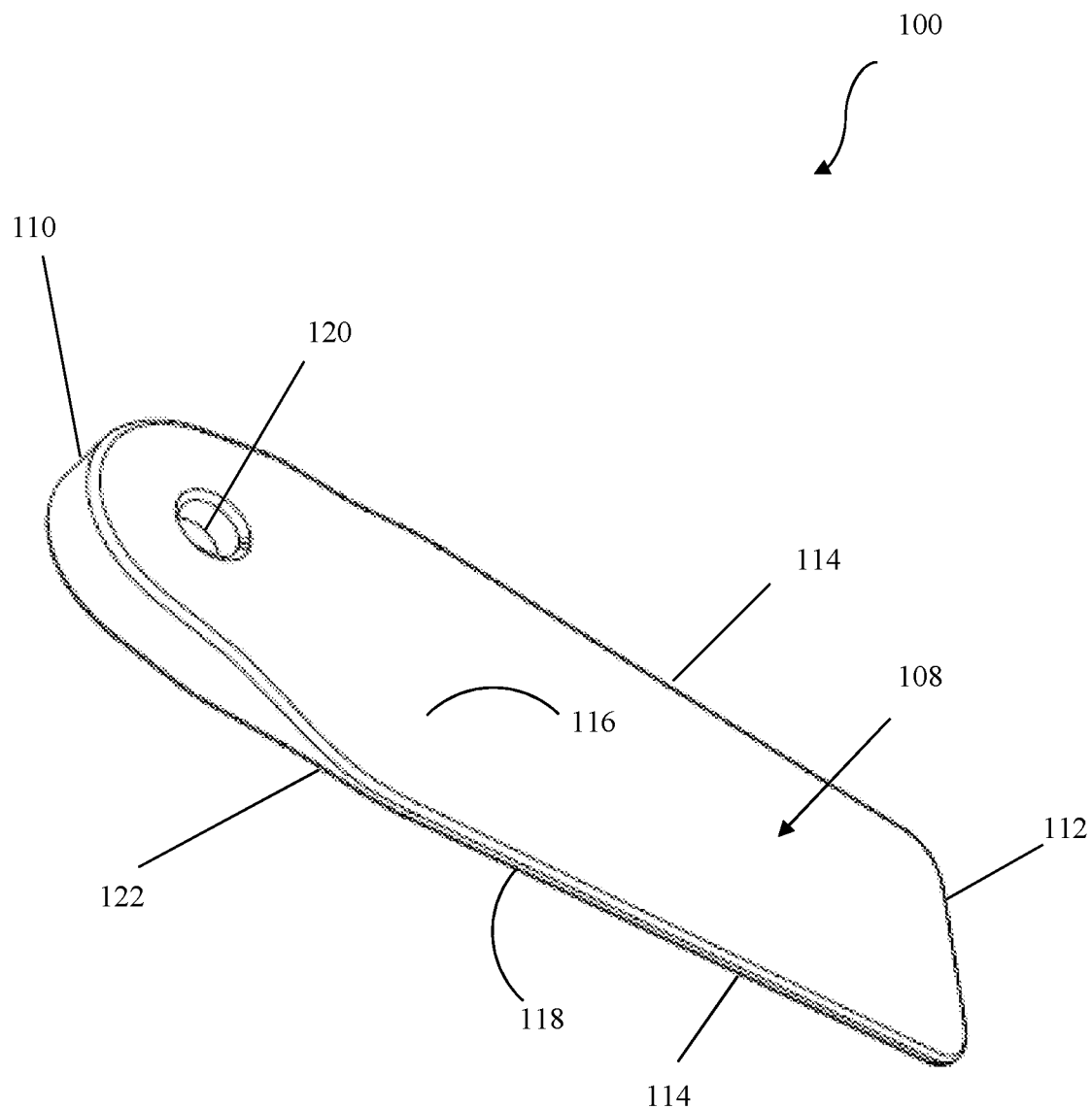
FIG. 1 is a perspective view of an exemplary embodiment of the closure opener device.
Figure 2:
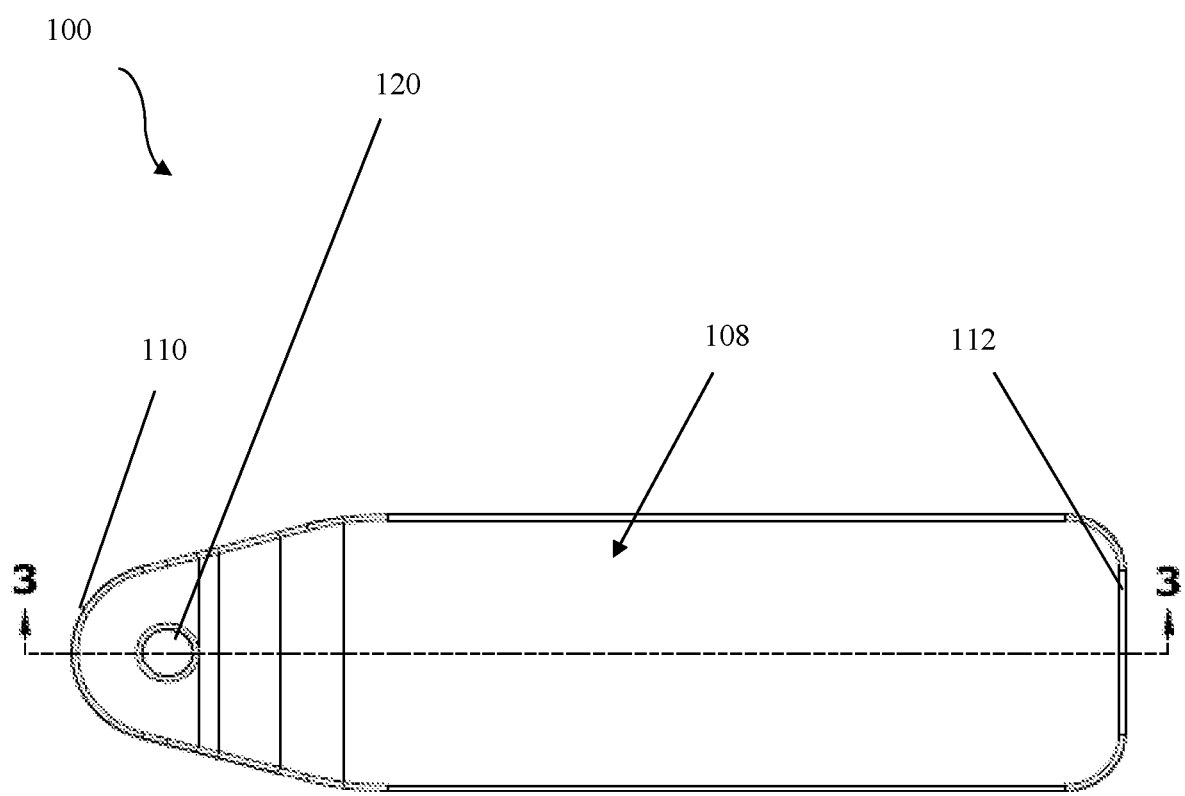
FIG. 2 is a plan view of an exemplary embodiment of the closure opener device.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that several techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Referring to FIGS. 1-4, embodiments of the closure opener device 100 include a member configured to be enveloped or partially enveloped about a closure top 102 (e.g., a cap, lid, cover, etc.) of a container 104 (bottle, jar, can, etc.) while also being grasped by a user's hand or fingers. The closure opener device 100 is then manipulated by the user's hand in a rotational, twisting, prying, oscillatory, etc. motion to transfer such forces to the closure opener device 100. Note that the manipulation merely requires movement of a user's hand, finger(s), or wrist so as to wield, exert, or apply a force to the pad body 108. The geometric configuration, flexibility, hardness, and coefficient of friction of the closure opener device 100: 1) effectively increases the diameter of the closure top 102, allowing it to be more easily grasped; 2) smooths out sharp or cornered edges of the closure top 102 for additional ease of grasping; 3) grips to smooth-surfaced closure tops 102 that otherwise would be slippery; 4) provides adequate frictional contact between it and the closure top 102 when the closure top 102 has liquid or other objects that would otherwise reduce frictional contact between a user's hand (or other conventional device) and the closure top 102; 5) conforms to both the closure top 102 and the user's hand/finger(s) to provide a more ergonomic feel and improved leverage, especially by users suffering from arthritis or some other disability; 6) provides an insulating barrier for a user's hands when the closure top 102 is cold or hot; and 7) transfers the rotational and/or other forces imparted upon it to the closure top 102, allowing for twisting, unscrewing, decoupling, disengaging, loosening, etc. of the closure top 102 from the container 104.

The container 104 can be a jar, bottle, can, etc. having a mouth end 106. The mouth end 106 may have a lip or neck portion to facilitate engagement with the closure top 102 (e.g., bottle cap, lid, cover, etc.). For instance, the lip or neck can be tapered to facilitate an interference fit type engagement between the mouth end 106 and the closure top 102, flanged to facilitate a crimped type engagement between the mouth end 106 and the closure top 102, threaded to facilitate a threaded type engagement between the mouth end 106 and the closure top 102, etc.

The closure opener device 100 is a member configured to be at least partially enveloped about the closure top 102 while also being grasped by a user's hand and/or fingers. Enveloped as used herein includes surrounding, encircling, swathing, wrapping around, or otherwise being in physical contact with so as to form an interface between at least a portion of the closure opener device 100 and at least a portion of the closure top 102. In the exemplary embodiments, the member of the closure opener device 100 is a pad having a pad body 108, a pad top 110, a pad bottom 112, pad sides 114, a pad gripping surface 116, and a pad hand surface 118. When in use, the pad gripping surface 116 is the surface that forms the interface between the closure opener device 100 and the closure top 102. The pad hand surface 118 is the surface that forms the interface between the closure opener device 100 and the user's hand or fingers. As will be explained herein, the pad gripping and hand surfaces 116, 118 each have specific material properties that generate benefits for using them in such a manner however, it is understood that the closure opener device 100 can be used such that its pad gripping surface 116 forms the interface between the closure opener device 100 and the user's hand/finger, while the pad hand surface 118 forms the interface between the closure opener device 100 and the closure top 102.

Figure 4:
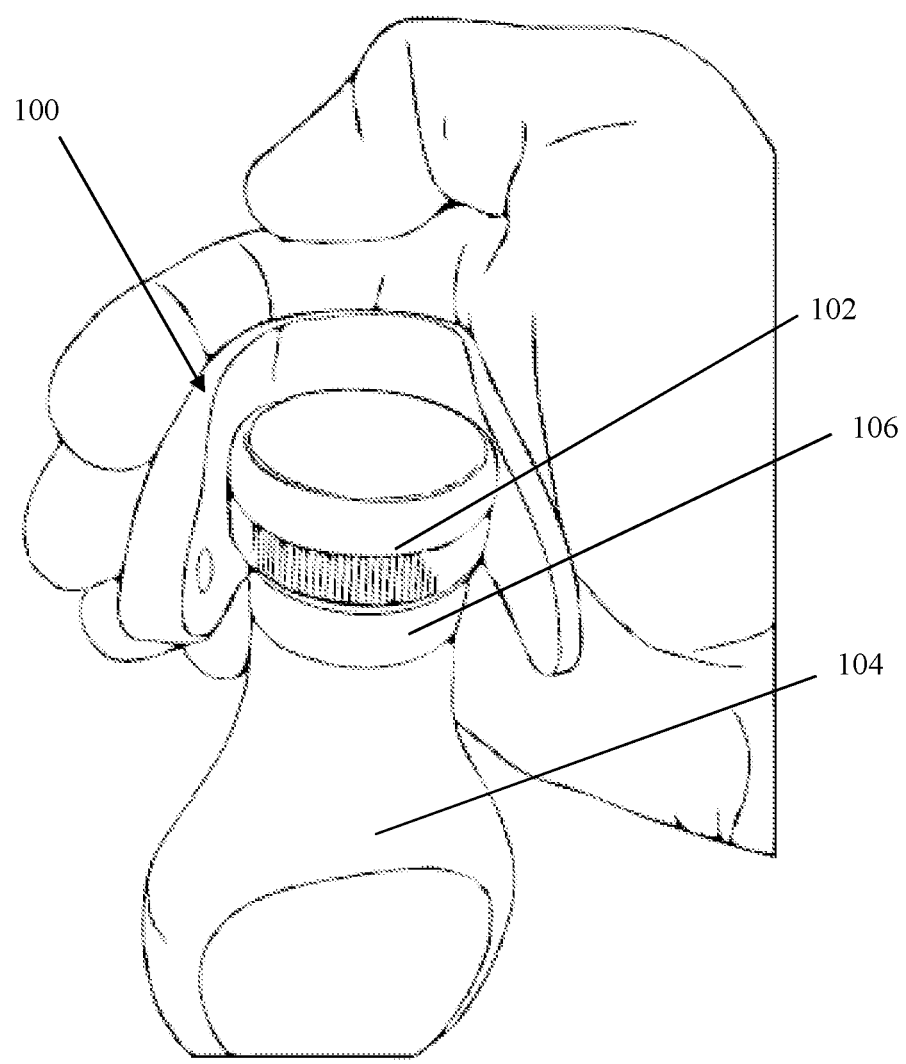
FIG. 4 is a perspective view of the closure opener of FIG. 1 in position on the hand and operatively engaged with the twist-top of a closure.

In exemplary embodiments, the pad body 108 can be an elongated member. For instance, the overall shape can be rectangular, wherein the pad top 110 and pad bottom 112 form the short sides of the rectangle and the pad sides 114 form the long sides of the rectangle. In addition, the pad body 108 can be a flat member so the pad body 108 is in the form of a rectangular sheet, wherein the pad gripping surface 116 and the pad hand surface 118 form the flat portions of the sheet. The possible dimensions for the closure opener device 100 will be discussed later, but it should be noted that the elongated shape of the device 100 allows the device 100 to be situated within the cusp of a user's hand. While in the cusp of the user's hand, the pad body 108 extends from the user's palm, leads into the cusp, and extends to the user's finger(s) (e.g., middle finger, index finger, ring finger, etc.). This adds to the ergonomic nature of the device 100. A user's natural arm and hand position when holding a container 104 and attempting to remove the closure top 102 therefrom, is to have their arms in front of them and palms having towards them, as shown in FIG. 4. This position allows the user to cusp the closure top 102 in the user's hand while the hand is in a natural position. With the device 100 cusped therein, a user can use his/her natural body position and body movement to open the closure top 102. This natural body position and movement further provides a user with maximum leverage to manipulate the closure top 102. In contrast, many conventional means to open closure tops 102 require a user's hand to be positioned such that the palm is facing downward. A twisting or prying motion when the hand is in this position places undue stress on the user—e.g., awkward and straining movement of the wrist. This is especially so for users suffering from a disability or some other condition that imposed limited range of motion.

In addition, if a user is suffering from a disability, the device 100 can be positioned within the user's cusp to allow a user to compensate for lack of strength—e.g., if a user's index finger is in pain, has limited range of motion, or is injured, the device 100 can be moved so that it extends along the user's middle or ring finger(s), allowing a user to handicap the index finger.

In addition, if the closure top 102 is a safety top in which a downward force must be applied before twisting the top 102, the device 100 still allows a user to maintain the natural position discussed above. Normally, a safety top style closure top 102 requires a user to open the top 102 with the palm facing downward so as to allow for simultaneous downward force and twisting motion. However, the closure opener device 100 provides enough frictional contact so as to allow a user to grasp the closure top 102 in the cusp of their hand, apply downward pressure, and twist the closure top 102, all while the hand is maintained in the natural position.

It is contemplated for the closure opener device 100 to be a portable unit. For instance, the closure opener device 100 can be placed in a user's clothing pocket, backpack pocket, carried about in a user's hand, etc. With this in mind, a portion of the pad body 108 can have at least one aperture 120 to facilitate attachment of a ring, carabiner, lanyard, etc. so as to allow a user to attach the closure opener device 100 to an ancillary device (e.g., belt, belt loop, backpack, etc.). It is contemplated for the aperture 120 to be formed in the pad top 110 portion and to be formed within the pad body 108 so as to extend from the pad gripping surface 116, through the pad body 108, and to the pad hand surface 118. To provide added structural integrity and support, the pad body 108 can be thicker at the pad top 110. For instance, the pad body 108 can be an elongated sheet, wherein the pad body 108 is of uniform thickness from the pad bottom 112 to a neck 122 located at or near the pad top 110. The thickness is the width of the pad body 108 between the pad gripping surface 116 and the pad hand surface 118. The thickness at the neck 122 increases from the neck 122 to the pad top 110. This increase in thickness can be a gradual increase, a stepped increase, etc. The aperture 120 is formed within the pad body 108 in a location between the neck 122 and the distal end of the pad top 110. The thicker pad body 108 at the neck 122 (or from the neck 122 to the pad top 110) reduces the likelihood of tearing of the material of the device 100 at aperture 120 if/when the aperture 120 is used to tether the device 100 to an object.

It is contemplated for the size and shape of the closure opener device 100 to be small enough to fit in the palm and fingers of the user's hand. It is further contemplated for the device 100 to be small enough to be portable. For instance, closure device 100 can be as small as ½-inches or 1.27 cm (lengths of the pad top 110 and pad bottom 112) by 1-inch or 2.54 cm (lengths of the pad sides 114), or a large as 7-inches or 17.78 cm (lengths of the pad top 110 and pad bottom 112) by 7-inches 17.78 cm (lengths of the pad sides 114). These dimension are exemplary, and it is understood that the dimensions can be anywhere in between these values. In a preferred embodiment, the closure device 100 is 1.5-inches 3.81 cm (lengths of the pad top 110 and pad bottom 112) by 5-inches or 12.7 cm (lengths of the pad sides 114). While it is contemplated for the closure opening device 100 to be portable, it need not be. Non-portable variations of the embodiment, intended for use in the kitchen or workshop for example, can be larger in size. For instance, the dimensions can be up to 12-inches by 12-inches or 30.48 cm by 30.48 cm, but preferably 3.5-inches by 7-inches or 8.89 cm by 17.78 cm.

The preferred dimensions disclosed herein take into account the ability to use a single device 100 on various sized closure tops 102, as well as various types of closure tops 102. For instance, the length of the pad sides 114 being 5-inches or 12.7 cm, for example, allows for a single device 100 to be used on pill bottles, soda bottles, produce jars, etc. As another example, the length of the pad top and bottom 110, 112 being 1.5-inches or 3.81 cm, for example, allows for the device 100 to be used on twist-off closure tops 102, snap-off closure tops 102, dislodge crimped closure tops 102, etc.

The closure opener device 100 should have enough thickness (the width of the pad body 108 between the pad gripping surface 116 and the pad hand surface 118) and integrity to distribute the forces provided by the user's hand/fingers during the opening process, eliminating potentially painful concentrations of pressure on the hand/fingers during opening. The thickness of the closure opener device 100, when engaged around a closure top 102 during the opening process additively increases the effective radius of the closure top 102 during the opening process. The effective increase in radius acts as an increased moment arm for the friction force during the opening process, ultimately increasing the available torque or proportionately decreasing the required friction force needed to open the closure top 102. The pad thickness can be as thin as 1/64-inches or 0.0396 cm, as thick as 1/2 inches or 1.27 cm, or any value in between. In a preferred embodiment, the thickness is 1/10-inches or 0.254 cm.

One of the key aspects of the device 100 is to conform to both the surface contours of closure top 102 and the user's hand/finger(s). This not only provides for a more ergonomic feel and improved leverage, it increased the surface area by which the pad gripping surface 116 makes contact with the closure top 102 surface and increased the surface area by which the pad hand surface 118 makes contact with the user's hand/finger(s). Increased surface area between the surfaces provides for added frictional contact. A user's hand and other means to open closure tops 102 do not conform much, if at all, to the closure top 102, let alone conform to both the closure top 102 and the user's hand. This ability to conform to both assists with providing adequate frictional contact to overcome any friction-reducing contaminant (e.g., water, oil, sand, dirt, etc.) that may be on the closure top 102.

As noted above, embodiments of the device 100 can have a neck 122. In an exemplary embodiment, the thickness of the pad body 108 at the neck 122 is 3/10-inches or 0.762 cm. The neck 122 thickness may vary depending on material and/or material combinations selected for the pad body 108, resulting in a neck thickness that can be within a range from 1/64-inches to 1/2-inches or 0.0396 cm to 1.27 cm.

As noted above, embodiments of the closure opener device 100 should be able to be small, portable, maintain contact friction between it and the closure top 102, maintain contact friction between it and the user's hand/fingers, not be too rigid, have an ergonomic shape, conformable to a wide variety of users' hands (including those with or without disabilities), conformable to a wide range of closure top 102 sizes, usable with a wide variety of closure tops 102 (e.g., screw top, pop top, crimp top, etc.), and be able to have a logo or design printed on the pad hand surface 118. Along with the shape and size of the closure opener device 100, the material selection for the closure opener device 100 can play an important role in its functionality and acceptance by the user. For the closure opener device 100 to be readily accepted by a prospective user, it is contemplated for it to be functional, portable, ergonomic, and appealing in style. The material should conform easily around a variety of closure top sizes, shapes, materials, and textures, yet must have enough integrity to distribute the forces provided by the fingertips and palm. Materials that produce unpleasant smells, fade in coloring, inadvertently stain garments, or tend to dry rot over e will be rejected by the user. Materials that do not take well to printing of personalized markings or product branding will also be rejected by customers and manufacturers.

It is contemplated for a single material or combination of materials that are flexible and have sufficiently high coefficients of friction can be used. It is further contemplated for the material to have a Modulus of Elasticity of at least 1.0 and a Shore A durometer hardness of at most 80, demonstrating sufficient flexibility. It is contemplated for the material to have a coefficient of friction between it and the material of the closure top 102 (which can be metal, plastic or other polymer, glass, ceramic, etc.) to be at least 0.2, demonstrating sufficient coefficient of friction.

Rubber-like materials, sheets formed of thermoplastic materials, embossed-surface plastic materials, embossed-surface films, laminated sheets, nonwoven materials, knit fabrics, woven fabrics, natural sheet materials and the like which are flexible and having a sufficiently high coefficient of friction, are suitable as materials for the invention. Due to the many desirable properties of silicone rubbers, more specifically liquid silicone rubber, it is the preferred material for the device 100. Other materials can include compression molded, high consistency rubber (HCR) silicone rubber, thermoplastic polyurethane (TPU), and thermoplastic elastomers (TPE).

The properties of silicone polymers, more specifically silicone rubbers and liquid silicone rubbers, stand out over other materials in a variety of markets. Silicone rubbers are considered hypoallergenic, odorless, tasteless. Silicone rubbers are highly resilient, extremely water repellent (hydrophobic), will not become brittle over time, and have relatively uniform properties over a wide temperature range. Silicone rubbers also have excellent resistance to ultraviolet light, flammability, salt water, organic solvents, and resistance to absorption of oils. These properties make silicone rubbers particularly suitable as a material for a closure opener.

When comparing polyurethane rubber and silicone rubber in liquid form or high consistency rubber (HCR) form for injection or compression molding, silicone rubber injection molding stands out in volume, purity, and quality. For silicone rubber, there is no ash content on cured parts, and parts may be made dyed or completely transparent. The simplicity of the materials to be mixed lead to shorter cycle times, reliable batch-to-batch consistency, and superior product quality for silicone rubber. In addition, printed silicone inks on silicone rubber are crisp, accurate, and long-lasting.

Materials having a Shore A durometer hardness value of about 40, and could range from as low as about 10 to as high as about 80, are sufficiently soft and conformable for use as materials for the device 100. Harder materials will not be easily conformable to the hand or the closure top 102, and will negatively affect the storage and portability of the closure opener device 100. Softer materials will lack enough integrity to transmit loads during the opening process and/or will deflect excessively under load.

Modulus of Elasticity, also called Young's Modulus or Tensile modulus, is a representation of the stress/strain curve of a material in tension. Useful materials can be non-rigid and flexible materials having a Modulus of Elasticity as low as 1.0, as high as 10.0, or have any value there-between. In a preferred embodiment, the material has a Modulus of Elasticity of 1.3.

With the pad gripping surface 116 being used to engage the closure top 102, the material of the closure opener device 100 should be able to deliver enough friction to open a closure top 102 made of various materials, made of various surface finishes, used in different environments, and/or used in the presence of foreign contaminants, liquids, and/or oils. Friction is a force that opposes the relative lateral motion of two solid surfaces in contact. During the opening process, friction coefficient values arise from a complex combination and interaction of the inherent coefficient of friction values for each material, inter-surface adhesion, surface roughness, surface features, surface deformation, surface contamination, the dry or wet condition of the surfaces, as well as the type of friction occurring during opening which includes: (a) no relative movement of the two surfaces known as static or non-moving fiction; and (b) relative movement of the two surfaces known as kinetic or sliding friction.

Most combinations of two dry materials have friction coefficient values between 0.2 and 0.6. Rubber in contact with other surfaces can yield friction coefficients up to about 1.0 and sometimes greater. A value greater than 1.0 means the force required to slide an object along the surface is greater than the normal force of the surface supporting the object. The coefficient of friction of silicone rubber ranges from about 0.20 to more than 1.0. It is contemplated for the coefficient of friction for silicone rubber used as the device 100 to range from about 0.20 to about 0.80, but again it can be more than 1.0. For silicone rubbers, lower durometer hardnesses tend to have higher coefficients of friction. Texture introduced to silicone rubber surfaces tends to lower the coefficient of friction. Polished silicone rubber surfaces tend to result in a higher coefficient of friction. Silicone rubbers and/or acrylic rubber surfaces have a coefficient of friction that can be substantially larger than 1.0, especially with a polished surface. A polished silicone rubber surface results in an observed, somewhat tacky-to-the-touch, elastomer which gives the closure opener device 100 excellent gripping properties.

In some embodiments, the pad hand surface 118 can have a lightly bead blasted, frosted, or otherwise textured surface finish. This can be done to allow it to interface optimally with the user's hand/fingers including instances when the skin of the hand is wet or sweaty. This is also ideal for retaining printed ink in the form of personalized markings and/or product branding.

While various embodiments discuss use of the device 100 for opening or removing the closure top 102, it is understood that the device 100 can also be used to secure or tighten the closure top 102 to the container 104.

A preferred embodiment of the closure opener device 100 is rectangular in shape with dimensions of 1.5 inches or 3.81 cm (lengths of the pad top 110 and pad bottom 112) by 5-inches or 12.7 cm (lengths of the pad sides 114) has a thickness (the width of the pad body and 108 between the pad gripping surface 116 and the pad hand surface 118) of 0.090 inches or 0.2286 cm. The pad body 108 includes a neck 122, wherein the thickness increases via a gradual taper from the neck 122 to and levels off before reaching the pad top 110. The maximum thickness of the pad body 108 within the portion between the neck 122 and the pad top 100 is 3/1.0-inches or 0.762 cm. An aperture 120 is formed in the pad body 108 at a location between the neck 122 and the pad top 110. The pad body 108 is made from liquid silicone rubber, has a Shore A durometer hardness value of 50, a Modulus of Elasticity of 1.3, and a coefficient of friction from 0.20 to 0.80 with respect, to the material of the closure top 102, Any one or combination of the pad gripping surface 116 or pad hand surface 118 is polished. The pad hand surface 118 is textured. The pad hand surface 118 further includes ink print in the form of a logo, text, graphic, etc.

In an exemplary embodiment, a user cusps the device TOO in their hand so that the pad hand surface 118 is adjacent the user's hand/finger(s). The device 100 is placed against the closure top 102 so that the pad gripping surface 116 makes contact therewith, but preferably envelopes at least a portion of the closure top 102. A user closes their hand/finger(s) to conform the pad body 108 to both the user's hand/fingers and the closure top 102. A user then manipulates the device 100, thereby transferring forces to the pad body 108 and further to the closure top 102 and loosening the closure top 102 from the mouth 106. A user can continue to manipulate the device 100 while grasping both the device 100 and the closure top 102 as the closure top 102 disengages from the container 104.

While injection or compression molded rubber material is discussed herein, a variety of alternative embodiments are possible. For instance, embodiments of the device 100 can be made by pouring liquid rubber into a mold, as opposed to molding the device 100 via injection or compression. An injection or compression molded device 100 can be used to generate a unitary pad body 108 having predetermined shaped gripping and hand surfaces 116, 118. This can allow for generating a unitary pad body 108 having symmetrically shaped gripping and hand surfaces 116, 118, for example. With a pour molded device 100, a unitary pad body 108 can be made, but it may not be symmetrically shaped (e.g., —a single body opener with a non-symmetrically shaped body having one fully, open-faced, flat side would result from pouring liquid rubber-like materials into a mold to produce the complete part. Cut, stamped, extruded, or poured flat or textured sheets can be used to create the pad body 108 while retaining desired gripping properties. Combinations and/or laminates of fabric or nylon mesh, inserts, coated fabrics or materials, or friction coatings used to produce poured flat or textured sheets can be cut, stamped, extruded, or poured in molds to create the pad body 108 while retaining the desired gripping properties. However, the polished silicone rubber surface in the preferred embodiment should not be under-estimated and results in an exceptionally tacky surface which gives the closure opener excellent gripping properties across a variety of environmental conditions.

Figure 3:
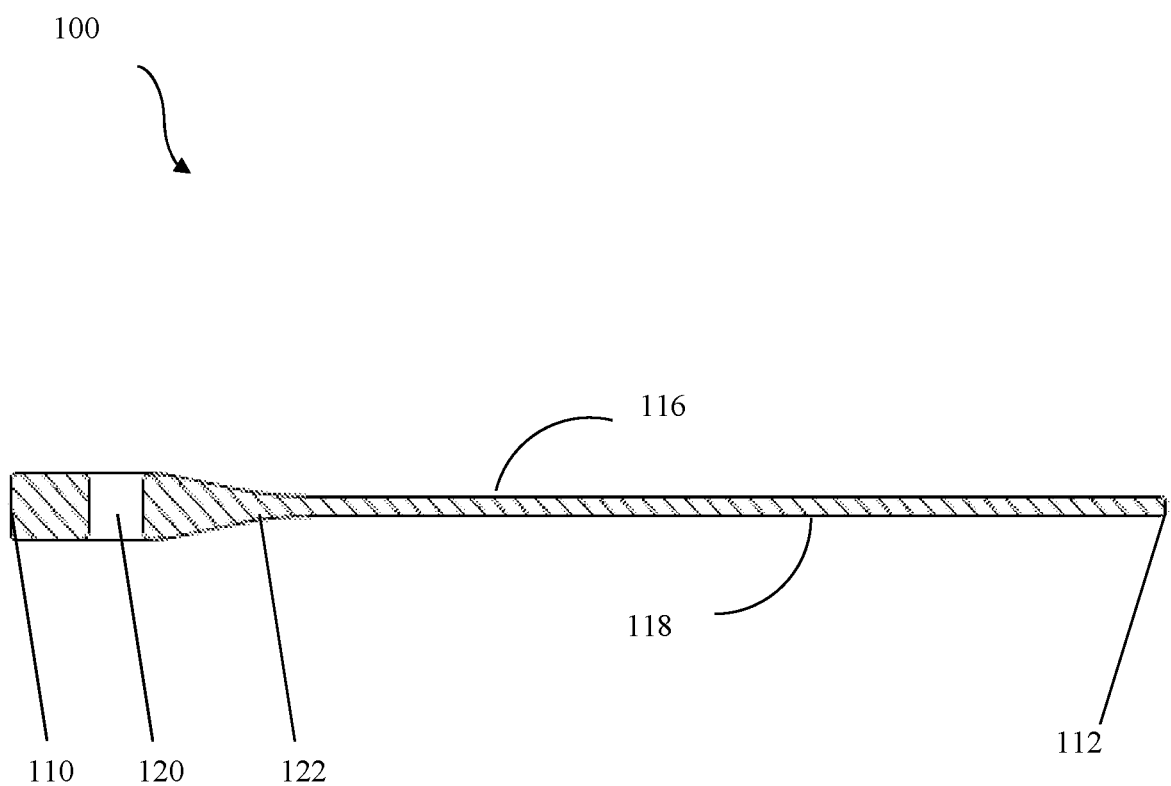
FIG. 3 is a cross-sectional view of the closure opener device shown in FIG. 2, taken at line 3-3.

A variety of embodiments with modifications to the sheet profile shown in FIG. 3 are possible including flat, corrugated, curved, and the like. A variety of surface textures, patterns, embedded inserts, or secondary surface coatings may also be introduced to the pad gripping surface 116 and/or the pad hand surface 118 in the form of embossed, engraved, or embedded shapes and patterns. However, the preferred embodiment and its material properties have been found to conform to closure tops 102 that are made of various materials and surface finishes.

A variety of alternative methods used to attach the closure opener device 100 are possible. Holes, loops, appendages, and/or foreign attachments of various shapes and sizes introduced anywhere on the pad body 108 may act as an aperture 120 and/or tethering device to attach the closure opener device 100 to an ancillary object. Multi-component and/or overmolded parts, each with different properties, can be used to fabricate the neck 122 and/or the aperture 120 on any portion of the pad body 108. Rigid or semi-rigid inserts or attachments, overmolded inserts, thermally fused parts, grommets, eyelets, or mechanically crimped, clamped, or physically attached components may serve as the apparatus to attach the closure opener device 100 to other items.

Although many alternatives have been considered, a single part, single body, single material injection or compression molded, silicone rubber solution stands out in quality, the number of achievable and desirable properties and functions available in the device 100. In addition, such an embodiment offers high-volume manufacturing, elimination of the need to assemble multiple parts, and the polished and ergonomic feel of the final product. As such, is this is the preferred embodiment of the present invention.

What is claimed is:

1. A closure opener device, comprising:
a pad body having a pad top, a pad bottom, pad sides, a pad gripping surface, a pad hand surface, and a pad thickness defined as a distance between the pat gripping surface and the pad hand surface;
wherein:
the pad body comprises a material having a Shore A durometer hardness less than or equal to 80, a Modulus of Elasticity of less than or equal to 10, and a coefficient of friction within a range from 0.20 to 0.80; and
the pad thickness is at least 0.0396 cm.

2. The device of claim 1, wherein the material is silicone rubber.

3. The device of claim 2, wherein the silicone rubber is liquid silicone rubber or compression molded silicone rubber.

4. The device of claim 1, wherein the material is thermoplastic polyurethane (TPU).

5. The device of claim 1, wherein the material is thermoplastic elastomer (ITE).

6. The device of claim 1, wherein the pad thickness is within a range from 0.0396 cm to 1.27 cm.

7. The device of claim 1, wherein the Shore A durometer hardness is within a range from 10 to 80.

8. The device of claim 1, wherein the Modulus of Elasticity is within a range from 1.0 to 10.0.

9. The device of claim 1, wherein at least one of the pad gripping surface and the pad hand surface is polished.

10. The device of claim 1, wherein the pad hand surface is textured.

11. The device of claim 1, wherein the pad hand surface includes a printed ink marking.

12. The device of claim 1, wherein the pad top and the pad bottom each have a length within a range from 1.27 cm to 30.48 cm, the pad side surfaces each have a length within a range from 2.54 cm to 30.48 cm, and the pad thickness is within a range from 0.0396 cm to 1.27 cm.

13. The device of m 1, wherein the pad body at or near the pad top includes an aperture.

14. The device of claim 1, wherein the pad body at or near the pad top includes a neck that is defined by an increase in thickness of the pad body.

15. A method of loosening or disengaging a closure top from a container, the method comprising:
placing a pad body having a pad top, a pad bottom, pad sides, a pad gripping surface, and a pad hand surface in a user's hand such that at least a portion of the pad body resides in a cusp of the user's hand and such that the pad hand surface is adjacent the user's hand;
placing the pad body against a closure top so that at least a portion of the pad gripping surface envelopes at least a portion of the closure top;
closing the hand to conform the pad body to the user's hand and to the closure top; and
manipulating the pad body to transfer forces from the user's hand to the closure top via the pad body, wherein the transfer of forces loosens or disengages the closure top from the container,
wherein the method further comprises tethering the pad body to an ancillary object via an aperture formed in the pad body.

16. The method of claim 15, wherein placing the pad body in the user's hand involves causing at least a portion of the pad body making contact with a user's finger.

17. The method of claim 16, herein the pad body, while residing in the cusp of the user's hand, extends from a palm of the hand, leads into the cusp of the hand, and extends to the user's finger.

18. A method of loosening or disengaging closure tops from containers, the method comprising:
placing a pad body having a pad top, a pad bottom, pad sides, a pad gripping surface, a and pad hand surface in a user's hand such that at least a portion of the pad body resides in a cusp of the user's hand and such that the pad hand surface is adjacent the user's hand;
placing the pad body against a first closure top of a first container so that at least a portion of the pad gripping surface envelopes at least a portion of the first closure top; closing the hand to conform the pad body to the user's hand and to the first closure top; and manipulating the pad body to transfer forces from the user's hand to the first closure top via the pad body, wherein the transfer of forces loosens or disengages the first closure top from the first container; and
placing the pad body against a second closure top of a second container so that at least a portion of the pad gripping surface envelopes at least a portion of the second closure top; closing the hand to conform the pad body to the user's hand and to the second closure top; and manipulating the pad body to transfer forces from the user's hand to the second closure top via the pad body, wherein the transfer of forces loosens or disengages the second closure top from the second container;
wherein:
the first closure top has a size that differs from a size of the second closure top; and/or
an engagement between the first closure top and the first container differs from an engagement between the second closure top and the second container.

19. A method fabricating a closure opener device, the method comprising:

introducing a material into a mold to form a pad body, the material having a Shore A durometer hardness less than or equal to 80, a Modulus of Elasticity of less than or equal to 10, and a coefficient of friction of at least 0.2, the pad body comprising:
  a pad body having a pad top, a pad bottom, pad sides, a pad gripping surface, a pad hand surface, a pad thickness defined as a distance between the pat gripping surface and the pad hand surface, the pad thickness being at least 0.0396 cm; and
wherein the introducing into the mold involves injection molding, compression molding, or pour molding.

* * * * *